(12) United States Patent
Lin et al.

(10) Patent No.: US 8,573,794 B2
(45) Date of Patent: Nov. 5, 2013

(54) BACKLIGHT MODULE

(75) Inventors: Hung-Chih Lin, Hsinchu (TW); Yi-Wen Lin, Hsinchu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 302 days.

(21) Appl. No.: 13/042,001

(22) Filed: Mar. 7, 2011

(65) Prior Publication Data

US 2011/0242793 A1 Oct. 6, 2011

(30) Foreign Application Priority Data

Mar. 31, 2010 (TW) .............................. 99109790 A

(51) Int. Cl.
*G02F 1/13357* (2006.01)
*G09F 13/04* (2006.01)

(52) U.S. Cl.
USPC ......... 362/97.3; 362/97.1; 362/97.2; 362/294

(58) Field of Classification Search
USPC ................................ 362/97.1–97.4, 294, 373
See application file for complete search history.

(56) References Cited

U.S. PATENT DOCUMENTS

| | | | |
|---|---|---|---|
| 7,374,306 B2 * | 5/2008 | Liu | 362/27 |
| 7,661,834 B2 * | 2/2010 | Fenyo | 362/19 |
| 2007/0019419 A1 * | 1/2007 | Hafuka et al. | 362/373 |

FOREIGN PATENT DOCUMENTS

| | | |
|---|---|---|
| TW | I242673 | 11/2005 |
| TW | M286937 | 2/2006 |
| TW | 200636341 | 10/2006 |
| TW | M309684 | 4/2007 |
| TW | 200719028 | 5/2007 |
| TW | 200720760 | 6/2007 |
| TW | 200743872 | 12/2007 |

* cited by examiner

*Primary Examiner* — Stephen F Husar
*Assistant Examiner* — James Cranson, Jr.
(74) *Attorney, Agent, or Firm* — Muncy, Geissler, Olds & Lowe, PLLC

(57) ABSTRACT

A backlight module includes a heat-dissipating element, at least one light-emitting element disposed on a first side of the heat-dissipating element, a back plate, and a heat-insulation element. The back plate has at least one opening and is disposed on the first side of the heat-dissipating element, and the back plate is not overlapped with the light-emitting element. The heat-insulation element is disposed between the back plate and the heat-dissipating element for reducing heat conduction between the back plate and the heat-dissipating element so as to prevent the heat generated by the light-emitting element from being conducted to the back plate.

10 Claims, 6 Drawing Sheets

BACKLIGHT MODULE

CROSS REFERENCE TO RELATED APPLICATION

This application claims priority of application No. 099109790, filed in Taiwan R.O.C on Mar. 31, 2010, under 35, U.S.C. §119; the entire contents of which are hereby incorporated by reference.

BACKGROUND OF THE INVENTION a. Field of the Invention

The invention relates to a backlight module.

b. Description of the Related Art

FIG. 7 shows a schematic diagram of a conventional backlight module. Referring to FIG. 7, a backlight module 100 includes a back plate 102, a light-emitting element 104, a first heat-conductive pad 106a,, a second heat-conductive pad 106b,, and a heat sink 108. In the backlight module 100, the heat generated by the light-emitting element 104 is conducted through the first heat-conductive pad 106a,, the back plate 102, and the second heat-conductive pad 106b, in succession and finally to the heat sink 108. Such heat conduction path results in extremely high thermal resistance, and thus considerable heat is piled up in a local area to reduce the efficiency and operating life of the light-emitting element 104. Besides, when a large amount of heat is conducted to an optical film (not shown) via the back plate 102, the optical film is deformed or deteriorated due to high temperature to result in inferior optical performance.

Hence, some designs are proposed to solve this problem. For example, as shown in FIG. 8, Taiwan patent no. M286937, discloses a backlight module 200 where a through hole 202a, is formed on a back plate 202 at a position corresponding to an LED unit 204. Hence, the LED unit 204 is allowed to penetrate the back plate 202 and directly touches the heat sink 208 to improve heat-dissipation efficiency. Besides, Taiwan patent no. M309684, and Taiwan patent publication no. 200719028 also disclose similar designs where a through hole 202a, is formed on a back plate 202 at a position corresponding to a light-emitting element.

However, the above designs fail to both provide competent heat-dissipation efficiency and prevent heat from being conducted to a back plate.

BRIEF SUMMARY OF THE INVENTION

The invention provides a backlight module having improved heat-dissipation efficiency and capable of preventing heat from being conducted to a back plate.

According to an embodiment of the invention, a backlight module includes a heat-dissipating element, at least one light-emitting element disposed on a first side of the heat-dissipating element, a back plate, and a heat-insulation element. The back plate has at least one opening and is disposed on the first side of the heat-dissipating element, and the back plate is not overlapped with the light-emitting element. The heat-insulation element is disposed between the back plate and the heat-dissipating element for reducing heat conduction between the back plate and the heat-dissipating element so as to prevent the heat generated by the light-emitting element from being conducted to the back plate.

In one embodiment, the backlight module further includes a heat-conductive pad or a thermal grease disposed between the light-emitting element and the heat-dissipating element.

In one embodiment, the light-emitting element includes a plurality of light-emitting diodes.

In one embodiment, the backlight module further includes at least one screw fastened between the back plate and the heat-dissipating element.

According to another embodiment of the invention, a backlight module includes a back plate, a heat-dissipating element, a heat-insulation element, and at least one light-emitting diode light bar. The back plate has a first side and a second side opposite the first side, and the heat-dissipating element is disposed on the first side of the back plate. The heat-insulation element is disposed between the back plate and the heat-dissipating element for reducing heat conduction between the heat-dissipating element and the back plate, and the light-emitting diode light bar is disposed on the second side of the back plate. The back plate has at least one opening, the shape of the opening corresponds to the shape of the light-emitting diode light bar, and the light-emitting diode light bar overlaps with the opening.

According to another embodiment of the invention, a backlight module includes at least one light-emitting element, a heat-dissipating element, a retaining frame, and a heat-insulation element. The heat-dissipating element is connected to one side of the light-emitting element, and the retaining frame accommodates at least one optical film and surrounds the light-emitting element. The heat-insulation element is disposed between the retaining frame and the heat-dissipating element for reducing heat conduction between the heat-dissipating element and the retaining frame and preventing the heat generated by the light-emitting element from being conducted to the retaining frame.

The embodiment or the embodiments of the invention may have at least one of the following advantages. Since the back plate does not exist between the light-emitting element and the heat-dissipating element, the overall thermal resistance is considerably reduced, and the heat generated by the light-emitting element is quickly conducted to the heat-dissipating element. Further, a heat-insulation element disposed between the back plate and the heat-dissipating element is allowed to reduce the heat conduction between the heat-dissipating element and the back plate. As a result, the heat generated by the light-emitting element is hard to be conducted to the back plate to thus prevent the heat from being conducted to an LCD panel and optical films. Therefore, the LCD panel and optical films are not deteriorated or deformed due to high temperature to achieve fine optical performance. In addition, the light-emitting element and the heat-dissipating element may integrate with each other to form a light-emitting module so as to facilitate assembly or disassembly. For example, in case the light-emitting element is damaged, the repair is made simply by taking the light-emitting module apart, and a front frame, an LCD panel, and optical films are not needed to be detached from a backlight module.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
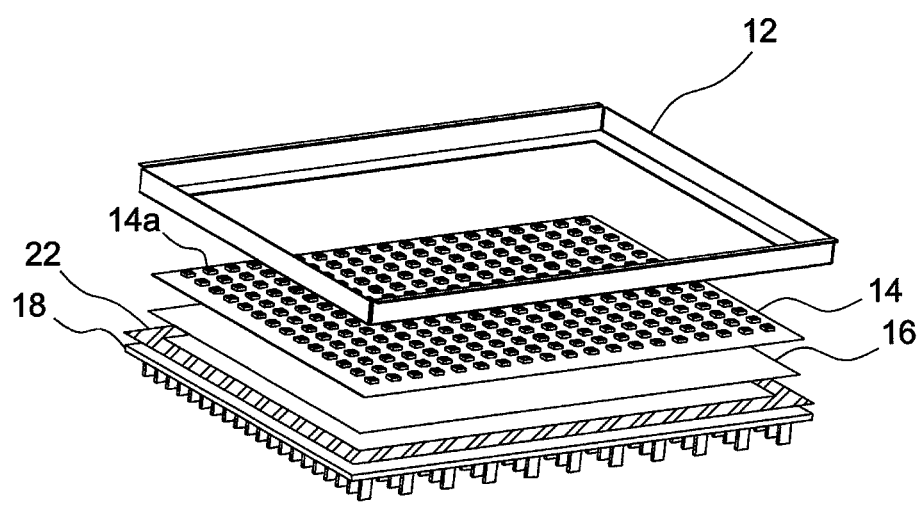
FIG. 1 shows an explosion diagram of a backlight module according to an embodiment of the invention.
Figure 2:
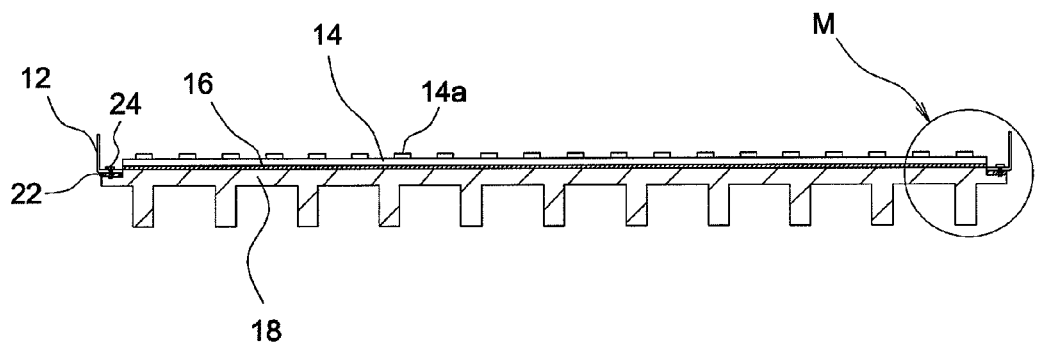
FIG. 2 shows a schematic cross-section of an assembled backlight module shown in FIG. 1.
Figure 3:
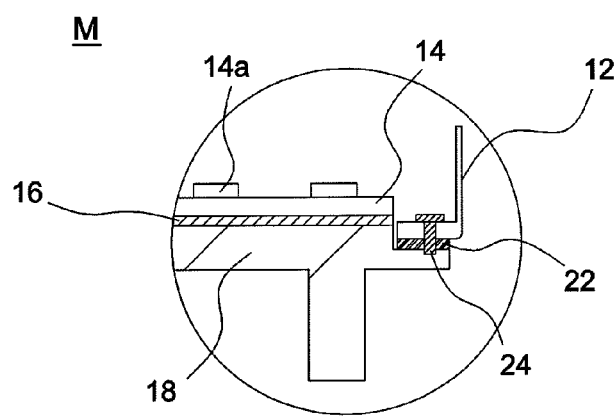
FIG. 3 shows a partially enlarged diagram M of FIG. 2.

FIG. 1 shows an explosion diagram of a backlight module according to an embodiment of the invention, FIG. 2 shows a schematic cross-section of an assembled backlight module shown in FIG. 1, and FIG. 3 shows a partially enlarged diagram M of FIG. 2. Please refer to FIG. 1 to FIG. 3, the backlight module 10 includes a back plate 12, at least one light-emitting element 14, a heat-conductive pad 16, a heat-dissipating element 18, and a heat-insulation element 22. The light-emitting element 14 is disposed on a first side of the heat-dissipating element 18, the back plate 12 is disposed on the periphery of the first side of the heat-dissipating element 18, and the back plate 12 surrounds the light-emitting element 14. The light-emitting element 14 and the heat-dissipating element 18 may integrate with each other to form a light-emitting module. The light-emitting element 14 may include a plurality of light-emitting diodes 14a, and the heat-insulation element 22 is disposed between the back plate 12 and the heat-dissipating element 18. In this embodiment, a heat-conductive pad 16 is disposed between the light-emitting element 14 and the heat-dissipating element 18. The light-emitting element 14 is connected to the heat-dissipating element 18, with the heat-conductive pad 16 being interposed between the light-emitting element 14 and the heat-dissipating element 18. Further, the heat-conductive pad 16 may be replaced with a thermal grease. Alternatively, the light-emitting element 14 may be directly connected to the heat-dissipating element 18 without an intervening heat-conductive pad or thermal grease. Besides, at least one screw 24 is fastened between the back plate 12 and the heat-dissipating element 18 to secure the back plate 12 to the heat-dissipating element 18. Certainly, the attachment of the back plate 12 and the heat-dissipating element 18 is not limited to the use of the screw 24, and other fastener such as a clasp member may also be used.

According to the above embodiment, on the heat-dissipating element 18 the back plate 12 is not overlapped with the light-emitting element 14; in other words, the back plate 12 does not exist between the light-emitting element 14 and the heat-dissipating element 18. Accordingly, the overall thermal resistance is considerably reduced, and thus the heat generated by the light-emitting element 14 is quickly conducted to the heat-dissipating element 18. Further, the heat-insulation element 22 is disposed between the back plate 12 and the heat-dissipating element 18 to reduce the heat conduction between the heat-dissipating element 18 and the back plate 12. As a result, the heat generated by the light-emitting element 14 is hard to be conducted to the back plate 12 to thus prevent the heat from being conducted to an LCD panel and optical films (not shown). Therefore, the LCD panel and the optical films are not deteriorated or deformed due to high temperature to achieve fine optical performance. Note the material of the heat-insulation element 22 is not limited, as long as the material is allowed to reduce the heat conduction between the back plate 12 and the heat-dissipating element 18.

Figure 4:
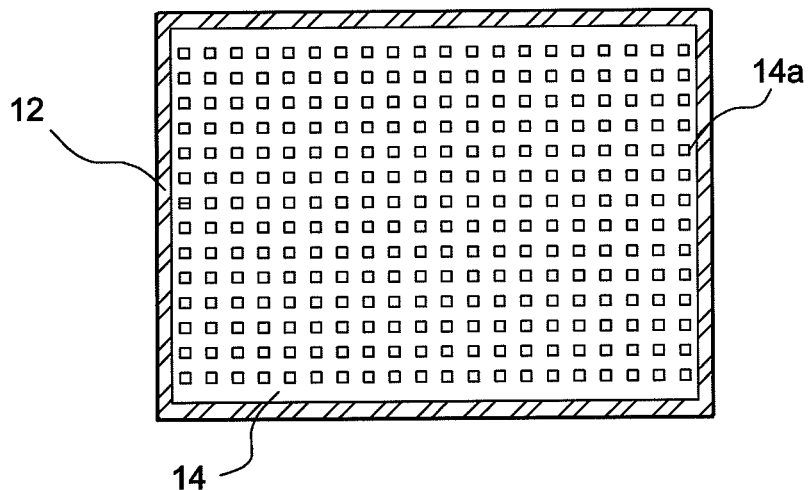
FIG. 4 is a plan view of the assembled backlight module shown in FIG. 1.
Figure 5:
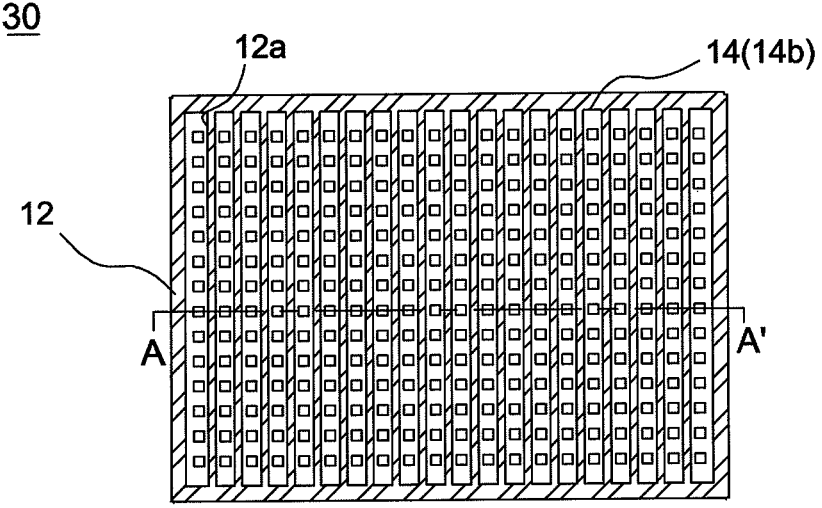
FIG. 5 shows a plan view of a backlight module according to another embodiment of the invention.

As shown in FIG. 4, in the above embodiment the back plate 12 is disposed on the periphery of the heat-dissipating element 18. However, this is not limited. For example, as shown in FIG. 5, in a backlight module 30 the light-emitting element 14 may include multiple light-emitting diode (LED) light bars 14b, the back plate 12 has an entire plane, and multiple openings 12a, are formed on the back plate 12. The shape of each opening 12a, corresponds to the shape of an LED light bar 14b. The back plate 12 has a first side and a second side opposite the first side, and the heat-dissipating element 18 is disposed on the first side of the back plate. The LED light bars 14b, are disposed on the second side of the back plate and on the heat-dissipating element 18 at a position overlapping with the openings 12a. Hence, as shown in a schematic cross-section of FIG. 6, the shape of each opening 12a, may vary according to the shape of a corresponding light-emitting element 14, and thus each LED light bar 14b, may penetrate the back plate 12 via a corresponding opening 12a, to directly touch the heat-dissipating element 18 or to connect the heat-dissipating element 18 via the intervening heat-conductive pad 16. Accordingly, the overall thermal resistance is also considerably reduced, and the heat generated by the light-emitting element 14 is quickly conducted to the heat-dissipating element 18.

Figure 6:
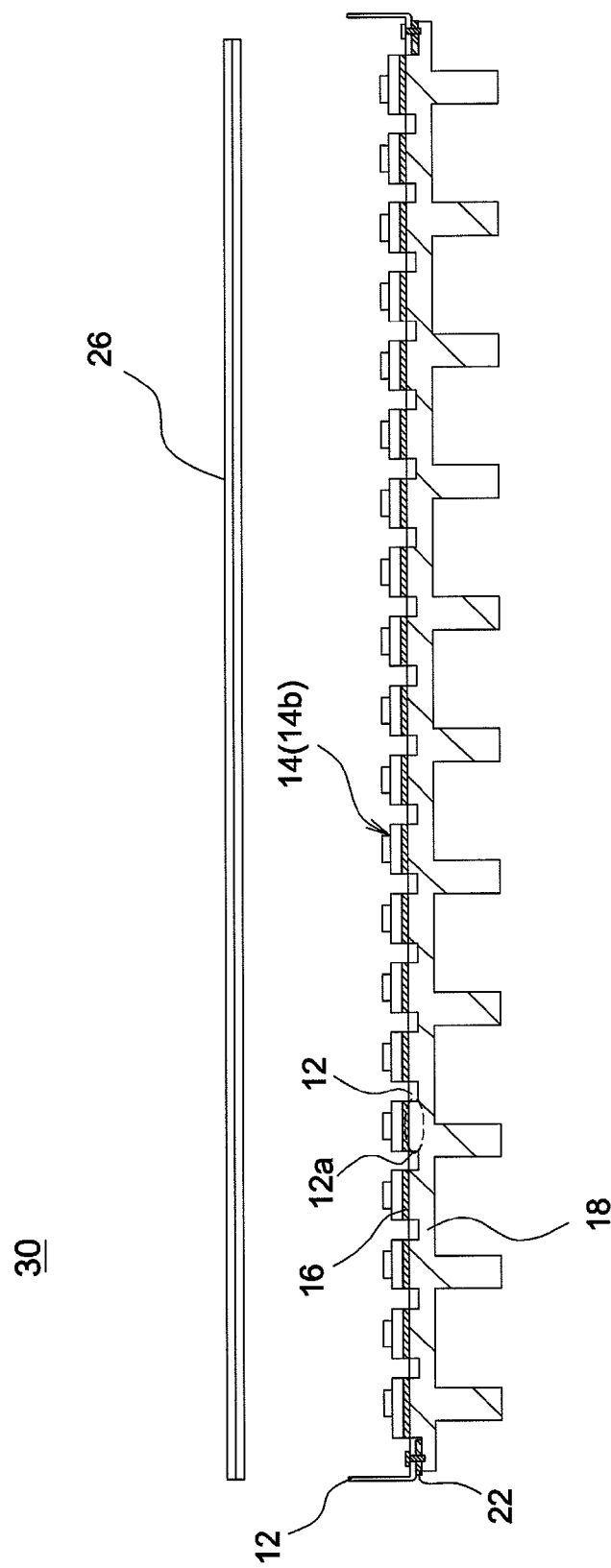
FIG. 6 shows a cross-section diagram along line A-A' of FIG. 5.
Figure 7:
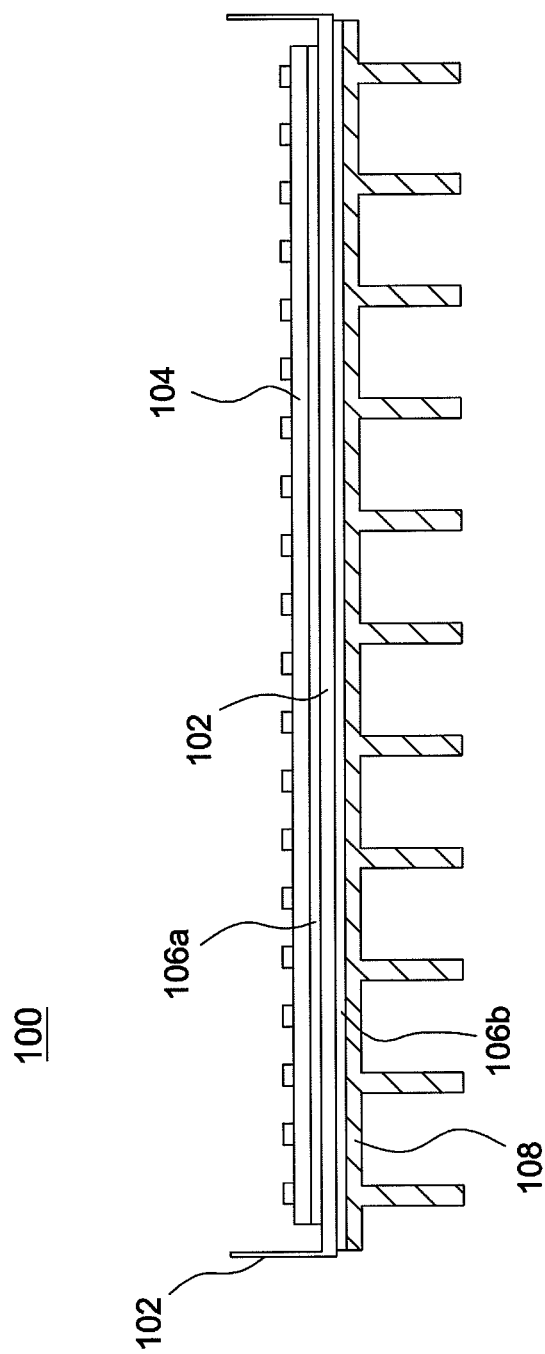
FIG. 7 shows a schematic diagram of a conventional backlight module.
Figure 8:
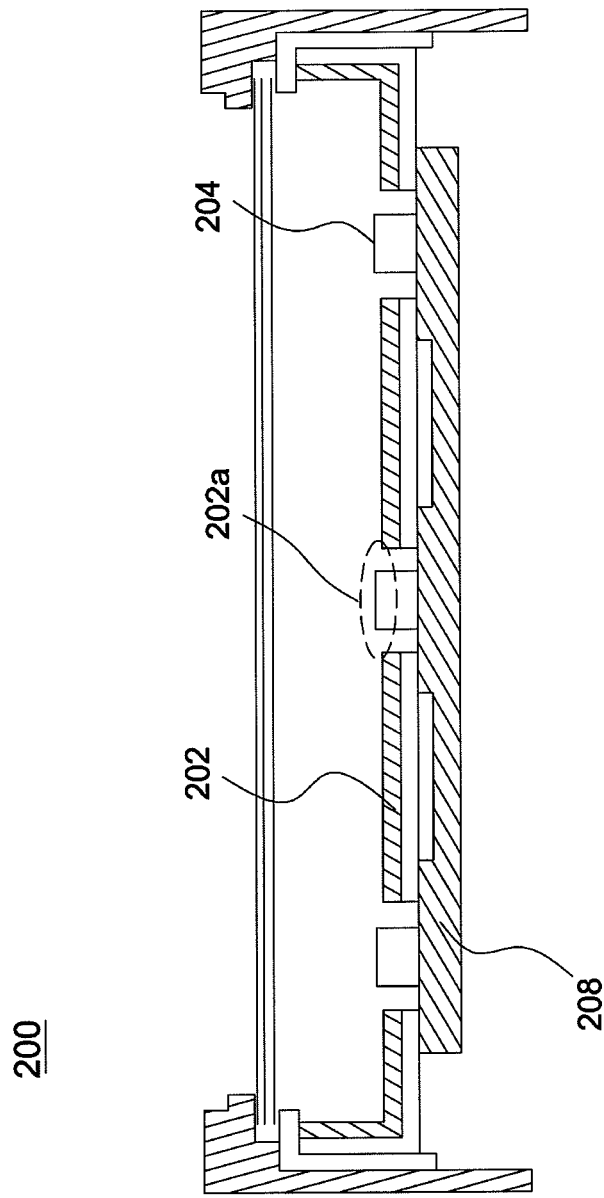
FIG. 8 shows a schematic diagram of another conventional backlight module.

Further, in the above embodiments, the back plate 12 functions as a retaining frame for accommodating the optical films 26 shown in FIG. 6, and the shape and material of the back plate 12 are not limited.

The embodiment or the embodiments of the invention may have at least one of the following advantages. Since the back plate does not exist between the light-emitting element and the heat-dissipating element, the overall thermal resistance is considerably reduced, and the heat generated by the light-emitting element is quickly conducted to the heat-dissipating element. Further, a heat-insulation element disposed between the back plate and the heat-dissipating element is allowed to reduce the heat conduction between the heat-dissipating element and the back plate. As a result, the heat generated by the light-emitting element is hard to be conducted to the back plate to thus prevent the heat from being conducted to an LCD panel and optical films. Therefore, the LCD panel and optical films are not deteriorated or deformed due to high temperature to achieve fine optical performance. In addition, the light-emitting element and the heat-dissipating element may integrate with each other to form a light-emitting module so as to facilitate assembly or disassembly. For example, in case the light-emitting element is damaged, the repair is made simply by taking the light-emitting module apart, and a front frame, an LCD panel, and optical films are not needed to be detached from a backlight module.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A backlight module, comprising:
   a heat-dissipating element;
   at least one light-emitting element disposed on a first side of the heat-dissipating element;
   a back plate having at least one opening and disposed on the first side of the heat-dissipating element, wherein the light-emitting element is disposed within the opening, the back plate is not overlapped with the light-emitting element, and the back plate surrounds the light-emitting element and the heat-dissipating element; and
   a heat-insulation element disposed between the back plate and the heat-dissipating element for reducing heat conduction between the back plate and the heat-dissipating element so as to prevent the heat generated by the light-emitting element from being conducted to the back plate.

2. The backlight module as claimed in claim 1, further comprising a heat-conductive pad or a thermal grease disposed between the light-emitting element and the heat-dissipating element.

3. The backlight module as claimed in claim 1, wherein the light-emitting element comprises a plurality of light-emitting diodes.

4. The backlight module as claimed in claim 1, further comprising:
   at least one screw fastened between the back plate and the heat-dissipating element.

5. A backlight module, comprising:
   a back plate having a first side and a second side opposite the first side;
   a heat-dissipating element disposed on the first side of the back plate;
   a heat-insulation element disposed between the back plate and the heat-dissipating element for reducing heat conduction between the heat-dissipating element and the back plate; and
   at least one light-emitting diode light bar disposed on the second side of the back plate;
   wherein the back plate has at least one opening, the shape of the opening corresponds to the shape of the light-emitting diode light bar, and the light-emitting diode light bar is overlapped within the opening.

6. The backlight module as claimed in claim 5, further comprising a heat-conductive pad or a thermal grease disposed between the light-emitting diode light bar and the heat-dissipating element.

7. The backlight module as claimed in claim 5, further comprising:
   at least one screw fastened between the back plate and the heat-dissipating element.

8. A backlight module, comprising:
   at least one light-emitting element;
   a heat-dissipating element connected to one side of the light-emitting element;
   a retaining frame for accommodating at least one optical film, wherein the retaining flame has at least one opening, the opening corresponds to the light-emitting element, the light-emitting element is overlapped within the opening, and the retaining frame surrounds the light-emitting element; and
   a heat-insulation element disposed between the retaining frame and the heat-dissipating element for reducing heat conduction between the heat-dissipating element and the retaining frame and preventing the heat generated by the light-emitting element from being conducted to the retaining frame.

9. The backlight module as claimed in claim 8, further comprising a heat-conductive pad or a thermal grease disposed between the light-emitting element and the heat-dissipating element.

10. The backlight module as claimed in claim 8, further comprising:
  at least one screw fastened between the retaining frame and the heat-dissipating element.

* * * * *